US008843234B2

(12) United States Patent
Tao et al.

(10) Patent No.: US 8,843,234 B2
(45) Date of Patent: Sep. 23, 2014

(54) DYNAMIC SPACE CHECK FOR MULTI-ARM SYSTEM MOVING ON A RAIL

(75) Inventors: Jianming Tao, Troy, MI (US); H. Dean McGee, Rochester Hills, MI (US); Chi-Keng Tsai, Bloomfield Hills, MI (US); Hadi Abu Akeel, Sterling, VA (US)

(73) Assignee: Fanuc America Corporation, Rochester Hills, MI (US)

( * ) Notice: Subject to any disclaimer, the term of this patent is extended or adjusted under 35 U.S.C. 154(b) by 1199 days.

(21) Appl. No.: 12/296,992

(22) PCT Filed: Apr. 13, 2007

(86) PCT No.: PCT/US2007/066638
§ 371 (c)(1),
(2), (4) Date: Oct. 13, 2008

(87) PCT Pub. No.: WO2007/121357
PCT Pub. Date: Oct. 25, 2007

(65) Prior Publication Data
US 2009/0204258 A1 Aug. 13, 2009

Related U.S. Application Data

(60) Provisional application No. 60/791,724, filed on Apr. 13, 2006.

(51) Int. Cl.
*G05B 19/18* (2006.01)
*B25J 9/16* (2006.01)

(52) U.S. Cl.
CPC ..... *B25J 9/1674* (2013.01); *G05B 2219/39083* (2013.01); *Y10S 901/02* (2013.01)
USPC ........... 700/250; 700/245; 700/247; 700/248; 700/249; 700/255; 901/2

(58) Field of Classification Search
None
See application file for complete search history.

(56) References Cited

U.S. PATENT DOCUMENTS

| | | | | |
|---|---|---|---|---|
| 4,870,592 A | * | 9/1989 | Lampi et al. | 700/112 |
| 5,161,936 A | * | 11/1992 | Kato | 414/728 |
| 5,247,608 A | * | 9/1993 | Flemming et al. | 700/255 |
| 5,438,647 A | * | 8/1995 | Nagamatsu et al. | 700/247 |
| 5,548,694 A | * | 8/1996 | Frisken Gibson | 345/424 |
| 5,561,742 A | * | 10/1996 | Terada et al. | 700/255 |
| 6,004,016 A | * | 12/1999 | Spector | 700/56 |
| 6,318,951 B1 | * | 11/2001 | Schmidt et al. | 414/744.5 |
| 7,622,158 B2 | * | 11/2009 | Clifford et al. | 427/427.2 |
| 7,765,031 B2 | * | 7/2010 | Nagamatsu | 700/255 |
| 7,813,830 B2 | * | 10/2010 | Summers et al. | 700/193 |
| 8,315,738 B2 | * | 11/2012 | Chang et al. | 700/255 |
| 8,340,820 B2 | * | 12/2012 | Nair | 700/255 |
| 2003/0100957 A1 | * | 5/2003 | Chaffee et al. | 700/18 |

(Continued)

FOREIGN PATENT DOCUMENTS

WO WO 2007003869 A1 * 1/2007 ........... G05B 19/401

*Primary Examiner* — Khoi Tran
*Assistant Examiner* — Jonathan L Sample
(74) *Attorney, Agent, or Firm* — Fraser Clemens Martin & Miller LLC; William J. Clemens

(57) ABSTRACT

A system and method for controlling motion interference avoidance for a plurality of robots are disclosed, the system and method including a dynamic space check system wherein an efficiency of operation is maximized and a potential for interference or collision is minimized.

18 Claims, 4 Drawing Sheets

Dynamic Space Setup
For Multi-robots and multi-controllers with computer network

(56) References Cited

U.S. PATENT DOCUMENTS

| | | |
|---|---|---|
| 2003/0109780 A1* | 6/2003 | Coste-Maniere et al. .... 600/407 |
| 2003/0225479 A1* | 12/2003 | Waled ........................... 700/245 |
| 2004/0001750 A1* | 1/2004 | Kremerman ............... 414/744.1 |
| 2005/0166413 A1* | 8/2005 | Crampton ...................... 33/503 |
| 2005/0273200 A1* | 12/2005 | Hietmann et al. ............ 700/248 |
| 2006/0167587 A1* | 7/2006 | Read .............................. 700/245 |
| 2007/0147982 A1* | 6/2007 | Rice et al. ..................... 414/800 |
| 2008/0231221 A1* | 9/2008 | Ogawa .................... 318/568.12 |
| 2008/0319557 A1* | 12/2008 | Summers et al. ............... 700/19 |
| 2009/0204258 A1* | 8/2009 | Tao et al. ...................... 700/248 |
| 2010/0230511 A1* | 9/2010 | Umezawa et al. ............ 239/104 |

\* cited by examiner

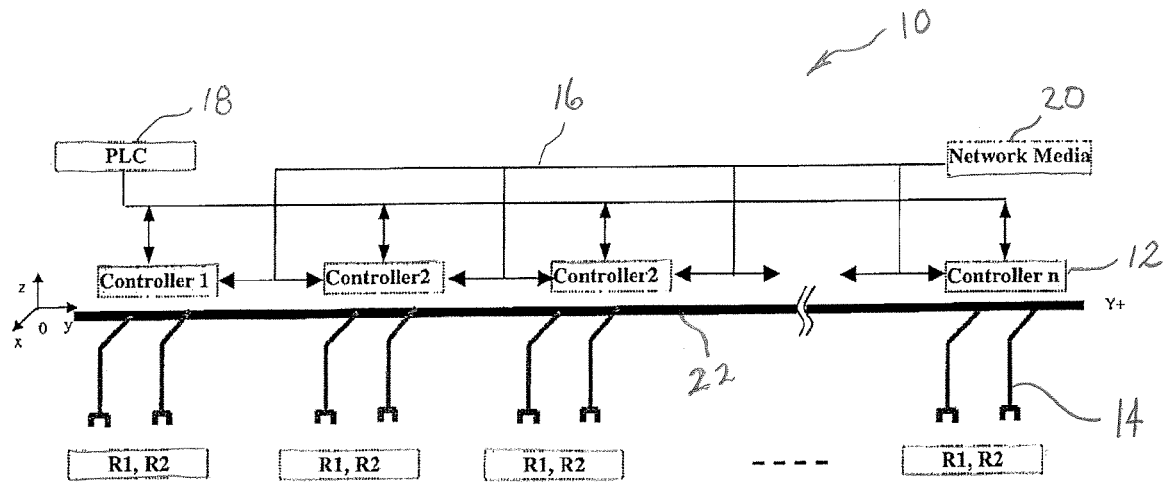
Figure 1. Multi-robots and multi-controllers with computer network
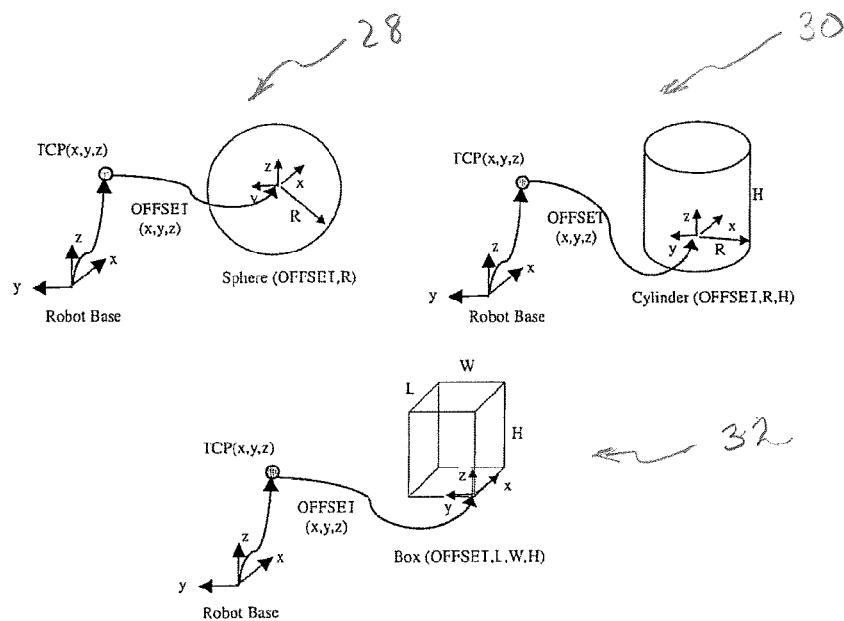
Figure 2. Dynamic Space Modeling

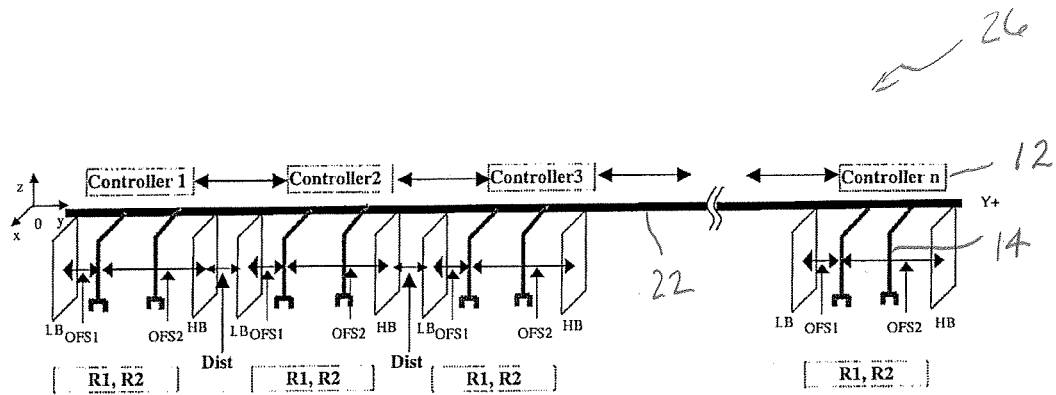
Figure 3. Dynamic Space Setup
For Multi-robots and multi-controllers with computer network
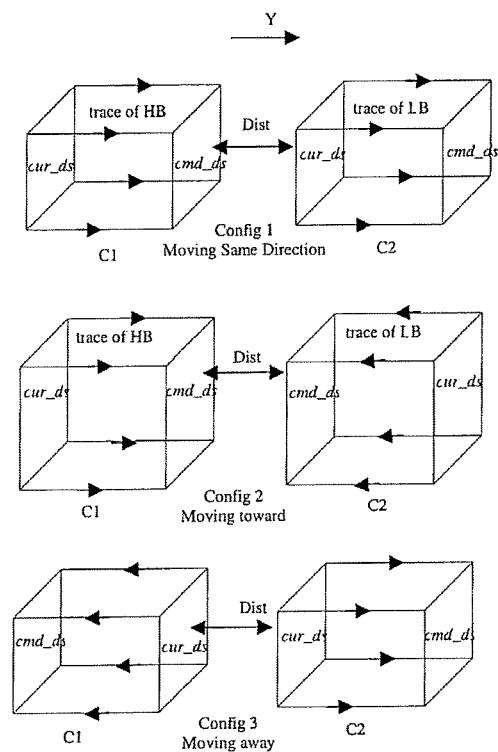
Figure 4. Minimal Dist Calculation with
Trace of Dynamic Space

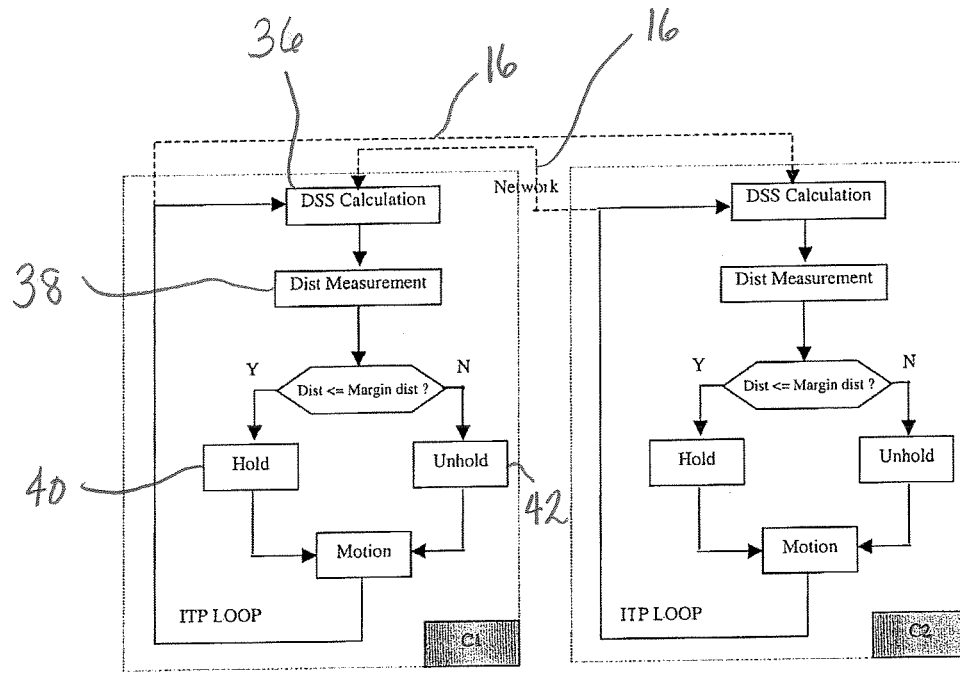
Figure 5. Control Flow for Auto-hold and unhold for two controllers
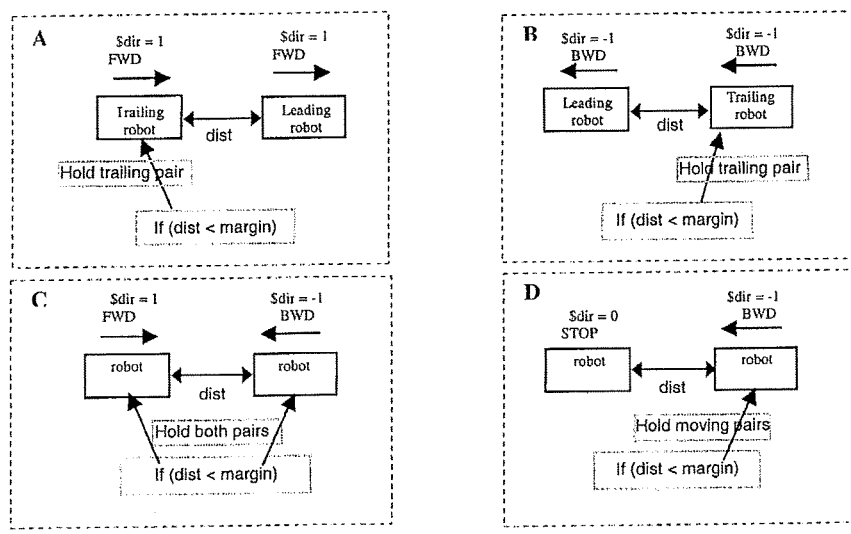
Figure 6. Deadlock Prevention

DYNAMIC SPACE CHECK FOR MULTI-ARM SYSTEM MOVING ON A RAIL

CROSS-REFERENCE TO RELATED APPLICATION

This application claims the benefit of U.S. Provisional Patent Application Ser. No. 60/791,724 filed on Apr. 13, 2006, hereby incorporated herein by reference in its entirety.

FIELD OF THE INVENTION

The present invention relates generally to a system for controlling a plurality of robots and a method for controlling motion interference avoidance for the plurality of robots.

BACKGROUND OF THE INVENTION

Movement of objects in space is a necessary task in a typical manufacturing environment. Robotics have increasingly been employed to effect the necessary movement. However, when multiple objects are being moved, a potential for interference between the objects exists. An interference exists if the at least two objects share the same space at the same time. That is, the objects have the same coordinates with respect to a common frame of reference.

With modern industrial robots moving at considerable velocities, interferences between robots can result in a collision and undesirable damage to the robots and work pieces being handled by the robots. The collisions may lead to costly down time in the manufacturing process. Accordingly, it is desirable to avoid such collisions.

Prior art systems and methods have been used in an attempt to minimize interferences and collisions. However, there are several shortcomings of the prior art systems and methods. Typically, a tool center point (TCP) is only checked relative to a predetermined interference area (static space). For multiple robots, it is difficult to directly or effectively prevent the collision or interference thereof. Further, it is difficult to specify an interference space in respect of a static coordinate system for multiple moving robots. Any interference space is not only a function of the robot motion path, but also a function of the motion speed. Difficulty also exists in attempting to handle a deadlock situation when two or more robots request to move to a common space at the same time.

Prior art systems also attempt to prevent a TCP for a robot from colliding in a fixed space relative to its world coordinate system. When multi robots (with multiple controllers) share common spaces or so called interference spaces during a task execution, each controller has to wait until no robot is in the common spaces, and then the controller can issue the motion control commands to allow the robot to move. This process is also called a wait and move process, which generally increases working cycle time. Draw backs exist when using the prior art systems with multiple robots. It is difficult to effectively specify an interference space in terms of a fixed coordinate system, because the interference space is not only the function of the robot motion path but also the motion speed. When more than one robot requests to move to a common space at the same time, it creates a deadlock situation where none of the robots can move because they are waiting for one another.

It would be desirable to have a system and method for controlling motion interference avoidance for a plurality of robots, wherein an efficiency of operation is maximized and a potential for interference or collision is minimized.

SUMMARY OF THE INVENTION

Consistent and consonant with the present invention, a system and method for controlling motion interference avoidance for a plurality of robots, wherein an efficiency of operation is maximized and a potential for interference or collision is minimized, has surprisingly been discovered.

In general terms, the invention relates to a system and method of controlling motion of a plurality of robots on the rail and a plurality of the controllers, wherein robots controlled by each controller will only work on a specified dynamic space, thus avoiding a collision. Control objectives are realized by defining a set of dynamic spaces for each controller, an ability to monitor the dynamic spaces in real time, and control mechanisms that are able to hold or unhold a motion of the robot controlled by each individual controller to militate against interference between robots within the dynamic space.

In one embodiment, the system for controlling motion interference avoidance for a plurality of robots comprises a plurality of controllers adapted for connection to a source of power; a sequence of instructions residing on the controller for execution thereon, the sequence of instructions including a dynamic space check control method; a plurality of robots in communication with and controlled by the controllers; and a programmable logic device in communication with the controllers.

The invention also provides methods for controlling motion interference avoidance for a plurality of robots.

In one method according to the invention comprises the steps of providing a plurality of controllers adapted for connection to a source of power, a plurality of robots in communication with and controlled by the controllers, and a programmable logic device in communication with the controllers; and providing a sequence of instructions including a dynamic space check control method residing on the controller for execution thereon, the dynamic space check control method further comprising the steps of setting up dynamic spaces for each of the robots; updating the dynamic spaces; detecting the dynamic spaces; measuring interferences; a motion hold command; a motion release command; and a deadlock decision.

In another method according to the invention comprises the steps of providing a plurality of controllers adapted for connection to a source of power, a plurality of robots in communication with and controlled by the controllers, and a programmable logic device in communication with the controllers; and providing a sequence of instructions including a dynamic space check control method residing on the controller for execution thereon, the dynamic space check control method further comprising the steps of setting up dynamic spaces for each of the robots including one of a spherical method, a cylindrical method, and a box method; updating the dynamic spaces including sending updated reference information from one of the controllers to other of the controllers via a network media at an interpolated interval; detecting the dynamic spaces including receiving the updated reference information from neighboring controllers at the interpolated interval; measuring interferences including reconstruction of the dynamic space of the neighboring controllers and calculation of a minimal distance between the dynamic space of the neighboring controller and the dynamic space of the one of the controllers, wherein the step of calculation of a minimal distance between the dynamic space of the neighboring controller and the dynamic space of the one of the controllers incorporates time, distance, and one of mechanical inertia of acceleration and deceleration; a motion hold command; a motion release command; and a deadlock decision.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a schematic diagram showing an example of a plurality of robots on a rail with a network media and PLC connected to each controller;

FIG. 2 shows three examples of modeling method for dynamic spaces that are relative to the TCP position;

FIG. 3 shows a typical example of setting up the dynamic spaces for a series of the top loader robots on the rail;

FIG. 4 illustrates the concept of the TRACE of the dynamic space; it also shows how to calculate the minimal distance between the two dynamic spaces in terms of the trice of the dynamic space;

FIG. 5 illustrates an example of automatic motion hold and unholds control flow with two controllers;

FIG. 6 shows the deadlock prevention in different situations; and

DESCRIPTION OF THE PREFERRED EMBODIMENT

Figure 7:
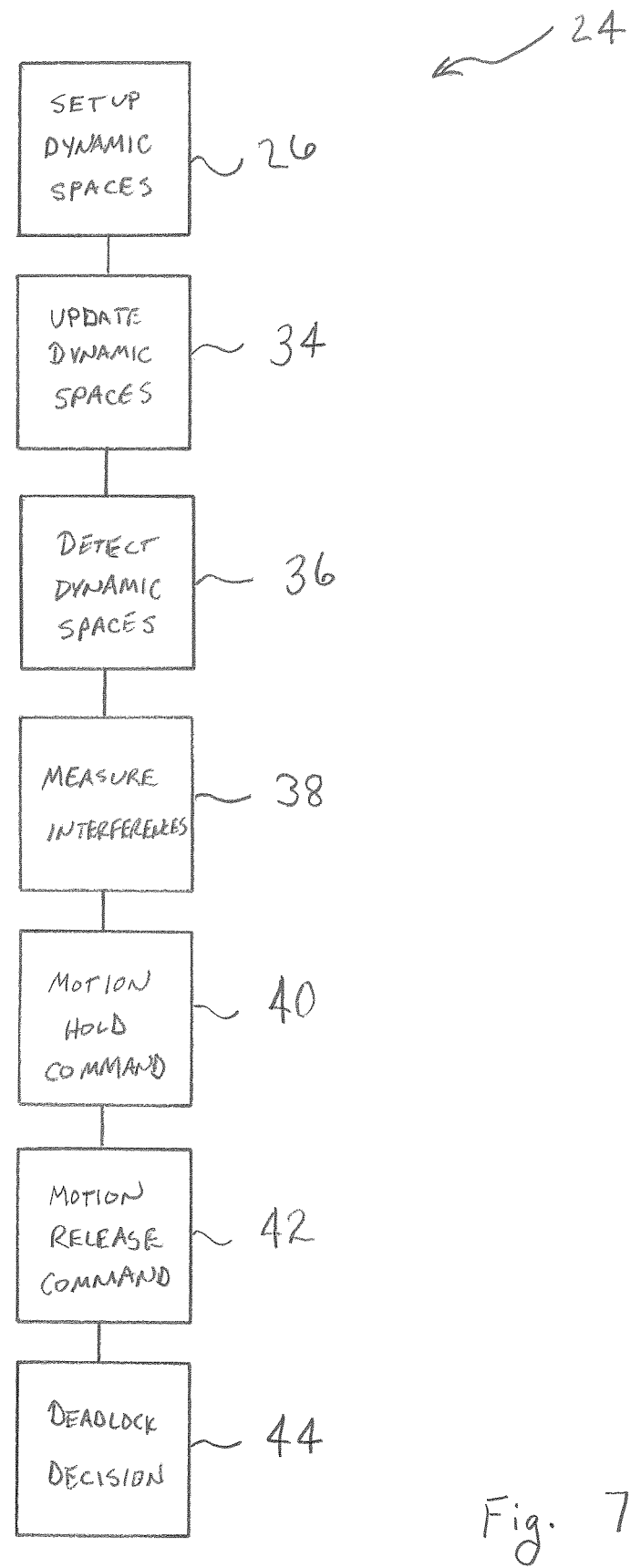
FIG. 7 is a schematic flow diagram showing a dynamic space check method according to an embodiment of the invention.

The following description is merely exemplary in nature and is not intended to limit the present disclosure, application, or uses. It should be understood that throughout the drawings, corresponding reference numerals also indicate like or corresponding parts and features. In respect of the methods disclosed, the steps presented are exemplary in nature, and thus, are not necessary or critical.

FIG. 1 is a schematic diagram showing a robotic system 10 known as a rail application. The robotic system 10 includes a plurality of robot controllers 12 for controlling at least one of a plurality of robots 14, the controllers in electrical communication with a source of electrical power. In the embodiment shown, each of the controllers 12 includes an associated motion system (not shown) to control two attached top loader robots 14 designated as R1 and R2, although other types and configurations can be used as desired. The controllers 12 are in communication with one another by a computer communication network 16 with a programmable logic device (PLC) 18 and are connected by network media 20. Each of the controllers 12 can execute a sequence of an instruction or program residing within the controller 12. In the rail application, the robots 14 move along a rail 22 and can perform independent or in a coordinated motion.

FIG. 7 shows a dynamic space check control method 24 according to an embodiment of the invention. In general, the control method 24 involves several steps. One step of the dynamic space check control method 24 involves setting up a dynamic space 26 for each controller 12. There are a variety of ways to set up a dynamic space in terms of a geometric model and a reference point. In FIG. 2, three methods for setting up a dynamic space 26 are shown: a spherical method 28; a cylindrical method 30; and a box method 32. The methods 28, 30, 32 shown are for dynamic spaces that are relative to a tool center point (TCP) position, although other methods can be used as desired. Additionally, other shapes and configurations can be used without departing from the scope and spirit of the invention. Each modeling utilizes a set of parameters. For the spherical method 28, TCP, an offset OFFSET from the TCP, and a radius R of the sphere are used. For the cylindrical method 30, TCP, an offset OFFSET from the TCP, a height of the cylinder H, and a radius of the cylinder R are used. TCP, an offset OFFSET from the TCP, a height of the box H, a length of the box L, and a width of the box are used for the box method 32. For purposes of the method disclosed herein, it is assumed that all of the methods 28, 30, 32 have the same orientation as the TCP position. It is understood that other configurations can also be used.

FIG. 3 illustrates a method of setting up the dynamic spaces 26 for the robots 14. For purposes of illustration, it is assumed that all of the robots 14 have a common world coordinate frame and the world coordinate Y-axis is aligned with a longitudinal axis of the rail 22. Each controller 12 is controlling the pair of robots 14 designated by R1 and R2. A first axis of each robot 14 is aligned with the rail 22. A set of dynamic spaces for each controller 12 is defined by a low boundary LB and a high boundary HB relative to a Y-axis position of the robot 14 designated by R1 represented by an offset 1 OFS1 and an offset 2 OFS2, respectively. The low boundary LB and the high boundary HB are defined as planes that are substantially perpendicular to the rail 22 and move along the first axis of the robot 14 designated by R1. Therefore, the low boundary LB and the high boundary HB specify a space region for each controller 12. A minimal distance between the high boundary HB (or the low boundary LB) to the low boundary LB (or the high boundary HB) of a neighboring controller is designated DIST. A motion of the robots 14 is controlled by the different controllers 12 so that DIST is always greater than a margin distance, thus militating against an interference among the dynamic spaces.

Another step of the dynamic space check control method 24 involves updating the dynamic spaces 34 during a task execution. Because the set up dynamic space 26 is attached to a reference frame or a position, the set up dynamic space 26 dynamically changes during movement of the robot 14. Each controller 12 sends updated reference information to the other controllers 12 via the network media 20. The updated reference information is sent in a selectable interval of time, normally at an interpolated interval ITP. For the top loader robot 14 application, the reference information is typically a Y coordinate position (a position on the rail) of one of the robots 14 designated by R1 for each of the controllers 12. The reference information is sent to a neighboring controller 12 via the network media at every interpolated interval ITP.

Next, the dynamic spaces are detected 36 across the controllers 12. Each controller 23 receives the updated reference information from other controllers at a desired interval. Typically, the desired interval is a multiple interval of the interpolated interval ITP, depending on a capacity of the network media 20. For the top loader robot 14 application, each controller receives the updated reference information of the neighboring controllers 12 at every interpolated interval ITP. Based on the updated reference information, each controller 12 calculates the dynamic spaces, the low boundary LB, and the high boundary HB for the neighboring controllers 12 with respect to its own reference frame.

A measurement of interferences 38 of the dynamic spaces is then determined between the controllers 12. The measurement of interferences 38 step further involves reconstruction of the dynamic space of the neighboring controller 12 and a calculation of the minimal distance DIST between the dynamic spaces. The distance measured between the dynamic spaces incorporates mechanical inertia of acceleration or deceleration, time, and distance in order to effectively militate against interference between the dynamic spaces. In order to illustrate the measurement, the following terminologies are used:

Current position (cur_pos) refers to an instantaneous measurement of a position at the present time.

Current frame (cur_frm) refers to an instantaneous measurement of a frame at the present time.

Command position (cmd_pos) refers to an interpolated position at the present time that the robot intents to move to.

Command frame (cmd_frm) refers to a coordinate frame at the present time, derived from a set of cmd_pos.

Current dynamic space (cur_ds) refers to a space occupation at present time derived from one or set of cur_pos or cur_frm.

Command dynamic space (cmd_ds) refers to a space occupation at present time derived from one or set of cmd_pos or cmd_frm.

Trace of the dynamic space (tr_ds) refers to a total dynamic space occupation from cur_ds to the cmd_ds.

Minimal distance of two dynamic spaces is defined by minimal distance of their traces of the dynamic spaces.

FIG. 4 illustrates how the distance DIST of the dynamic space is calculated in terms of a TRACE of dynamic space for different configurations, where C1 and C2 represent respective first and second controllers 12, and each cube represents a TRACE of a dynamic space. Left and right cubes for each configuration represent respectively the dynamic space HB for C1 and LB for C2.

Configuration 1, R1 for C1 and C2 moving in +Y (move same direction), DIST equals the distance from cmd_ds of C1 to cur_ds of C2.

Configuration 2, R1 for C1 and C2 move toward each other. DIST equals the distance from cmd_ds of C1 to cmd_ds of C2.

Configuration 3, R1 for C1 and C2 moves away from each other. DIST equals the distance from cur_ds of C1 to cur_ds of C2.

A motion hold command 40 is issued by the controllers 12 to stop the robots 14 at command positions whenever the measured minimal distance DIST between the dynamic spaces equals or is less than a specified marginal distance. The hold command militates against the minimal distance DIST being less than the marginal distance.

A motion unhold command or motion release command 42 is issued by the controllers 12 once the measured minimal distance DIST is greater than the specified marginal distance. Accordingly, all robots 14 being held resume motion. FIG. 5 illustrates an example of how the motion hold command and the motion unhold command control flow between two controllers 12. Each controller 12 independently conducts the dynamic space calculation 36 and the distance measurement 38, and makes a motion control decision. However, each controller 12 sends or receives reference information to or from the other controller 12 such that dynamic space is calculated based on updated reference information. Data sending or receiving is accomplished via the network 16 connected between the controllers 12.

The dynamic space check control method 24 includes a step of making a deadlock decision 44. Typically, when a potential interference is detected, the motion hold command 40 is issued to the robots 14. To prevent a deadlock, where the robots will not resume motion, the deadlock decision step 44 is activated. The deadlock decision step 44 checks the measured distance DIST of the dynamic space and checks a rate of change of the measured distance DIST. If the motion of the robot 14 will result in an increase of the measured distance DIST from the previous measured distance DIST, then the robot 14 will be issued the motion release command 42, even if the current measured distance DIST is less than the marginal distance. FIG. 6 depicts the control logic.

The trailing robot in case A and B of FIG. 6 will be held until the interference is cleared due to the motion of the leading robot.

The leading robot in case A and B of FIG. 6 will not be held because the motion of the leading robot will clear the dynamic space interference for the trailing robot.

If neighboring robots move toward each other as in C of FIG. 6, the system will hold both robots (or both pairs) upon the detection of the space interference. Manual intervention is required to clear this situation.

If one robot is stationary while the other robot (or robot pair) is moving toward the stationary robot as in D of FIG. 6, the system will hold the moving robot (or robot pair) only.

The deadlock decision step 44 allows an operator to get out the deadlock situation as quickly as possible. In the meantime, the dynamic space check control method 24 to militate against the deadlock situation also maximizes a production cycle efficiency.

The dynamic space check control method 24 can be easily defined in terms of a specified moving frame or reference point of interest relative to the robot 14 within the controller 12. The dynamic space check control method 24 is dynamically updated with its reference frame or reference point during task execution. Additionally, the dynamic space check control method 24 can be easily represented across controllers 12 because it is easier to pass a reference frame or a reference point from one controller 12 to another controller 12 via network media 20 than to pass a geometric space. Interference avoidance is also facilitated for multiple moving robots 14. The motion hold command and the motion release command of the dynamic space check control method 24 also optimizes a cycle time for the robots 14. The dynamic space check control method 24 also voids using hardware to achieve the required functionality.

For coordinated motion between groups of robots 14 controlled by a common controller 12, a control system known as a space control manager system is provided within each common controller 12. The space control manager system controls traffic or priority for a common space accessed by one of the robots 14 or group of robots 14. The traffic or priority can be controlled for each common spaced accessed, within or across controllers 12, group motion, or independent motion. This facilitates additional functionality for multiple robots to access a common space. The additional functionality includes support for multiple robot 14 groups dynamic space check control within one controller 12, multiple robot 14 groups across the controllers 12, multiple robot 14 groups teach pendent (TP) program execution, concurrent single robot 14 group TP program execution, multiple robot 14 group TP program and single robot 14 group TP program execution, coordinated motion, and jog operation for multiple group motion.

In order to facilitate the additional functionality, additional control methods are provided within the controllers 14. For multiple robot 14 groups dynamic space check control within one controller 12, the common space control manager controls the priority for involved groups dynamically for each common space Priority of the group motion is determined according to the following rules. Priority is assigned on a first come, first served basis. Thus, the group arriving the earliest according to a waiting queue is assigned the highest priority. For group motion or coordinated motion, all the robots 14 within the groups have the same priorities when the groups are in the waiting queue waiting for a space to be cleared.

For multiple robot 14 groups across the controllers 12 accessing a common space, the controller 12 whose group or groups of robots 14 occupy the space has a higher priority than another controller 12. The space control manager determines a priority of its own controller 12 based on the status of the other controller 12, as well as the status of its own controller 12. When its own controller has a higher priority, dynamic space check control within one controller 12 is followed. When no group occupies the common space and no group is in the waiting queue, the space control manager's own controller surrenders control, which allows the other controller 12 to take control if a group or groups are waiting in the queue to access the common space. If two robots 14 from different controllers 12 intend to access the common space at the same time, the controller with a higher priority assignment will be permitted to access the common space first.

The space control manager controls a state transition for each of multiple robot 14 groups that access a common space. For each state transition, the common space manager takes an action within motion sub-systems interrupt (INTR) or filter (FLTR) tasks to verify that group motion requirements will not be violated. For movement OUT→IN, access to the space is permitted, and the space is designated as occupied. In respect of movement OUT→WAIT, access to the space is not permitted, motion is held, and the waiting priority for the motion group is updated in the queue. For WAIT→IN, access is permitted into the space, the group motion is released, and the waiting priority for the motion group in the queue is updated. An occupation designation for the space is cancelled for IN→OUT movement. For movement IN→IN and OUT→OUT, motion is not restricted since the space status is not changed.

For concurrent single robot 14 group TP program execution, the space control manager assigns the same priority to each group member in the group to permit access to the common space. When one of the groups has to wait due to an occupied space, all of the groups within the group are held simultaneously. The space control manager allows the holding group or groups to complete an interpolated position for a current interpolation period (ITP) to maintain the group motion relationship while all groups stop at a held position.

When releasing groups when the space becomes available, the space control manager releases the motion simultaneously. This allows the group motion relationship to be maintained while motion release is occurring.

When using an interpolated position to check the space, the TCP is caused to wait inside of the space because the space control manager allows the interpolated point to complete. Causing the TCP to wait inside of the space may produce an ambiguous state, and result in a race condition after power is restored. It is more desirable to cause the TCP to wait outside of the space. At each interpolated stage, the TCP is determined by the actual command position of the TCP and the delta position calculated by the speed and a predication rate. Accordingly, the TCP can be stopped prior to actually entering the space using the TCP calculated according to this method.

The primary deadlock control involves prevention as well as easy handling if it does occur. Ideally, the motion control manager will not allow the deadlock to occur in normal operation condition. However exception may occur under following conditions: the space is enabled dynamically while multiple robots are in the same space; a program is aborted due to an error while multiple robots are in the same space; and a TP program is started while multiple robots are in the same space. The space control manager facilitates a recovery if a deadlock occurs. Any deadlock groups can be jogged if inside of a common space. Once the the group is jogged outside of the deadlocked space, the group cannot be jogged inside the space again unless the space is cleared. Non-deadlocked groups outside of the space can be jogged, but the non-deadlocked groups cannot be jogged into a deadlocked space until the space is cleared. A TP program involving groups not deadlocked can be executed. However, these groups involved in the TP program cannot enter the deadlocked space during execution of the TP program. Additionally, if an attempt is made to execute a TP program with groups involved in the deadlock, the system will abort the program and return to deadlock. Finally, if the deadlock involves groups from two controllers, recovery of the deadlock from either controller will recover the other controller from deadlock as well.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A system for controlling motion interference avoidance for a robot movable along a rail comprising:
   a robot movable along a rail parallel to a longitudinal axis of the rail;
   a controller in communication with and controlling movement of said robot along the rail in one direction and an opposite direction; and
   a sequence of instructions executed by said controller to control the movement of said robot along the rail, wherein said sequence of instructions includes a dynamic space check control method that automatically creates a dynamic space for said robot based upon a current position of said robot along the rail, a command position along the rail to which said robot is to be moved and the one direction, said dynamic space including a high boundary,
   said dynamic space check control method moving said high boundary with movement of said robot in the one direction of movement to maintain said high boundary at a distance from said current position of said robot equal to said command position plus a predetermined offset distance in the one direction and
   said dynamic space check control method moving said high boundary with movement of said robot in the opposite direction of movement to maintain said high boundary at a distance from said current position of said robot equal to said predetermined offset distance in the one direction.

2. The system according to claim 1 wherein said dynamic space includes a low boundary, said dynamic space check control method moving said low boundary with movement of said robot in the one direction to maintain said low boundary at a distance from said current position of said robot equal to another predetermined offset distance opposite the one direction and said dynamic space check control method moving said low boundary with movement of said robot in the opposite direction to maintain said low boundary at a distance from said command position of said robot equal to said another predetermined offset distance in the opposite direction.

3. The system according to claim 2 wherein said high boundary and said low boundary each are a plane extending perpendicular to the longitudinal axis of the rail.

4. The system according to claim 1 wherein said sequence of instructions includes measuring interferences by said controller automatically creating another dynamic space for another robot adjacent said robot based upon reference information received from another controller in communication with said another robot, and said controller controlling movement of said robot to maintain at least a predetermined marginal distance between said dynamic space and said another dynamic space.

5. The system according to claim 1 wherein the creating of said dynamic space includes one of a spherical method, a cylindrical method, and a box method.

6. A method for controlling motion interference avoidance for a robot movable along a rail, the method comprising the steps of:
providing a robot movable along the rail parallel to a longitudinal axis of the rail;
providing a controller in communication with and controlling movement of the robot along the rail in one direction and an opposite direction according to a sequence of instructions executed by the controller;
providing a dynamic space check control method in the sequence of instructions that creates a dynamic space for the robot based upon a current position of the robot along the rail, a command position along the rail to which said robot is to be moved and the one direction, the dynamic space including a high boundary;
the dynamic space check control method moving the high boundary with movement of the robot in the one direction to maintain the high boundary at a distance from the current position of the robot equal to the command position plus a predetermined offset distance in the one direction; and
the dynamic space check control method moving the high boundary with movement of the robot in the opposite direction to maintain the high boundary at a distance from the current position of the robot equal to the predetermined offset distance in the one direction.

7. The method according to claim 6 wherein the dynamic space includes a low boundary, the dynamic space check control method moving the low boundary with movement of the robot in the one direction to maintain the low boundary at a distance from the current position of the robot equal to another predetermined offset distance opposite the one direction and the dynamic space check control method moving the low boundary with movement of the robot in the opposite direction to maintain the low boundary at a distance from the command position of the robot equal to the another predetermined offset distance in the opposite direction.

8. The method according to claim 6 wherein the high boundary and the low boundary each are a plane extending perpendicular to the longitudinal axis of the rail.

9. The method according to claim 6 wherein the dynamic space check control method step creates the dynamic space by one of a spherical method and a cylinder method utilizing a tool center point and an offset from the tool center point.

10. The method according to claim 6 wherein the dynamic space check control method includes a step of setting up the dynamic space by establishing a common world coordinate frame having an axis aligned with the longitudinal axis of the rail and creating the high boundary relative to a position of the robot on the common world coordinate frame axis.

11. The method according to claim 6 wherein the dynamic space check control method includes a step of updating the dynamic space during operation of the robot by sending updated reference information to another controller via a network media at an interpolated interval, the another controller controlling movement of another robot along the rail.

12. The method according to claim 6 wherein the sequence of instructions includes measuring interferences by the controller creating another dynamic space for another robot adjacent the robot based upon reference information received from another controller in communication with the another robot, and the controller controlling movement of the robot to maintain at least a predetermined marginal distance between the dynamic space and the another dynamic space.

13. The method according to claim 12 wherein the step of measuring interferences includes calculation of a minimal distance between the dynamic spaces incorporating time, distance, and one of mechanical inertia of acceleration and deceleration of the robots.

14. The method according to claim 13 wherein the calculation of the minimal distance between the dynamic spaces is performed in terms of a trace of each of the dynamic spaces.

15. The method according to claim 12 wherein the dynamic space check control method includes a step of making a deadlock decision by issuing a motion hold command to stop the robots when a measured minimal distance between adjacent ones of the high and low boundaries is equal to or less than the predetermined marginal distance and if further motion of the robots would result in an increase of the measured minimal distance, issuing a motion release command to restart the second robots.

16. The method according to claim 15 wherein the step of making a deadlock decision includes stopping only a trailing one of the robots if the robots are moving in a same direction along the rail.

17. A system for controlling motion interference avoidance for a robot movable along a rail comprising:
a robot movable along a rail parallel to a longitudinal axis of the rail;
a controller in communication with and controlling movement of said robot along the rail in a plus motion direction and an opposite minus motion direction;
a sequence of instructions executed by said controller to control the movement of said robot along the rail, wherein said sequence of instructions includes a dynamic space check control method that automatically creates a dynamic space for said robot based upon a current position of said robot along the rail, a command position along the rail to which said robot is to be moved and the plus and minus motion directions, said dynamic space including at least one of a high boundary and a low boundary, wherein when said robot is moving in the plus motion direction, said dynamic space check control method moves said high boundary with said robot to maintain said high boundary at a distance from said current position of said robot equal to said command position plus a predetermined offset distance in the plus motion direction and said dynamic space check control method moves said low boundary with movement of said robot to maintain said low boundary at a distance from said current position of said robot equal to another predetermined offset distance in the minus direction; and
wherein when said robot is moving in the minus motion direction, said dynamic space check control method moves said high boundary with movement of said robot to maintain said high boundary at a distance from said current position of said robot equal to said predetermined offset distance in the minus motion direction and said dynamic space check control method moves said low boundary with movement of said robot to maintain said low boundary at a distance from said command position of said robot equal to said another predetermined offset distance in the minus motion direction.

18. The system according to claim 17 wherein said high boundary and said low boundary each are a plane extending perpendicular to the longitudinal axis of the rail.

* * * * *